United States Patent
Schillinger (10) Patent No.: US 9,170,804 B2
(45) Date of Patent: Oct. 27, 2015

(54) METHOD AND APPARATUS FOR MODIFYING COMPRESSED FILES

(75) Inventor: Patrick Schillinger, Lauchheim (DE)

(73) Assignee: Nokia Technologies Oy, Espoo (FI)

(*) Notice: Subject to any disclaimer, the term of this patent is extended or adjusted under 35 U.S.C. 154(b) by 255 days.

(21) Appl. No.: 13/542,093

(22) Filed: Jul. 5, 2012

(65) Prior Publication Data

US 2014/0013006 A1    Jan. 9, 2014

(51) Int. Cl.
  *G06F 15/16*  (2006.01)
  *G06F 9/44*  (2006.01)
  *H04L 29/08*  (2006.01)
  *H04L 29/06*  (2006.01)

(52) U.S. Cl.
  CPC  *G06F 8/68* (2013.01); *H04L 67/34* (2013.01); *H04L 69/04* (2013.01)

(58) Field of Classification Search
  CPC ............................ H04L 69/04; H04L 67/1097
  USPC .................................. 709/247; 717/170, 171
  See application file for complete search history.

(56) References Cited

U.S. PATENT DOCUMENTS

| | | | | |
|---|---|---|---|---|
| 5,894,588 A * | 4/1999 | Kawashima et al. | ............ | 710/68 |
| 6,106,570 A * | 8/2000 | Mizuhara | ....................... | 717/169 |
| 6,216,175 B1 * | 4/2001 | Sliger et al. | .................... | 717/169 |
| 6,243,766 B1 * | 6/2001 | Sliger et al. | ........................ | 710/2 |
| 6,449,764 B1 * | 9/2002 | Sliger et al. | .................... | 717/170 |
| 6,466,999 B1 * | 10/2002 | Sliger et al. | ..................... | 710/68 |
| 6,493,871 B1 * | 12/2002 | McGuire et al. | .............. | 717/173 |
| 6,496,974 B1 * | 12/2002 | Sliger et al. | ................... | 717/106 |
| 2005/0281469 A1 * | 12/2005 | Anderson et al. | ............. | 382/232 |
| 2007/0083571 A1 * | 4/2007 | Meller et al. | ................... | 707/203 |
| 2010/0077141 A1 * | 3/2010 | Achler | .......................... | 711/108 |

\* cited by examiner

*Primary Examiner* — Moustafa M Meky
*Assistant Examiner* — Sahera Halim
(74) *Attorney, Agent, or Firm* — Alston & Bird LLP (57) ABSTRACT

A method, apparatus and computer program product are provided for preparing and installing update packages for compressed files. In the context of a method, a method for preparing an update package is provided that includes receiving an original file and a modified file, causing the original file and the modified file to be decompressed, and generating one or more delta files based on the decompressed original file and the decompressed modified file. A corresponding method for installing an update package is also provided that includes receiving the update package comprising one or more delta files corresponding to an original file, causing the original file to be decompressed, generating one or more modified subfiles based on the one or more delta files and the decompressed original file, and generating a compressed modified file by compressing the one or more modified subfiles.

16 Claims, 7 Drawing Sheets

METHOD AND APPARATUS FOR MODIFYING COMPRESSED FILES

TECHNOLOGICAL FIELD

An example embodiment of the present invention relates generally to techniques for modifying compressed files and, more particularly, to a method and apparatus for preparing and installing update packages for compressed files.

BACKGROUND

The software of certain user devices occasionally may need to be updated on occasion by the device manufacturer, a service provider, a software vendor, or another party. These updates may be provided in many ways. For example, if the user device is a wireless device, such as a cellphone, personal digital assistant (PDA), tablet, or the like, that communicates wirelessly with a network, an update package may be provided over the air, i.e., provided via a wireless local area network (WLAN), cell network, or other such wireless communication network, and installed on the device. In such a case, and indeed even in the case of a wired device, it is desirable that the update package be as small as possible to avoid download costs for the user and network traffic for the network operator.

One method of keeping the size of an update package relatively small is the use of a "delta file," which contains only the difference between an old file and a new file. Thus, the user only needs to download a delta file instead of the entire modified file. The device may then use the delta file to modify the old file so that it is identical to the new file.

While the use of delta files is generally an efficient means of providing update packages, problems can be introduced when using them with compressed files. In particular, compression may introduce bit changes which cause the differences between a compressed original file and a compressed modified file to accumulate to the point that a resulting delta file may be almost as large as the entire modified file.

BRIEF SUMMARY

A method, apparatus and computer program product are therefore provided according to an example embodiment of the present invention for modifying compressed files. In this regard, the method, apparatus, and computer program product of one embodiment may efficiently prepare binary update packages for compressed files. The method, apparatus, and computer program of another embodiment may install the efficiently-prepared binary update package for compressed files. Thus, by utilizing the method, apparatus, and computer program of these embodiments, the amount of data that may be exchanged between a device receiving an update and the provider of the update may be reduced.

In one embodiment, a method is provided that includes receiving an original file and a modified file. The method further includes causing the original file and the modified file to be decompressed and generating one or more delta files based on the decompressed original file and the decompressed modified file.

In another embodiment, a method is provided that includes receiving an update package comprising one or more delta files corresponding to an original file. The method further includes causing the original file to be decompressed, generating one or more modified subfiles based on the one or more delta files and the decompressed original file, and generating a compressed modified file by compressing the one or more modified subfiles.

In a further embodiment, an apparatus is provided that includes at least one processor and at least one memory including program code instructions, the at least one memory and the program code instructions being configured to, with the processor, direct the apparatus to at least receive an original file and a modified file. The apparatus is further caused to cause the original file and the modified file to be decompressed and generate one or more delta files based on the decompressed original file and the decompressed modified file.

In another embodiment, an apparatus is provided that includes at least one processor and at least one memory including program code instructions, the at least one memory and the program code instructions being configured to, with the processor, direct the apparatus to at least receive an update package comprising one or more delta files corresponding to an original file. The apparatus is further caused to cause the original file to be decompressed, generate one or more modified subfiles based on the one or more delta files and the decompressed original file, and to generate a compressed modified file by compressing the one or more modified subfiles.

In an even further embodiment, a computer program product is provided that includes a non-transitory computer readable medium storing program code portions therein. The computer program code instructions are configured to, upon execution, cause an apparatus to at least receive an original file and a modified file. The computer program code instructions are configured to, upon execution, cause the apparatus to at least cause the original file and the modified file to be decompressed and generate one or more delta files based on the decompressed original file and the decompressed modified file.

In another embodiment, a computer program product is provided that includes a non-transitory computer readable medium storing program code portions therein. The computer program code instructions are configured to, upon execution, cause an apparatus to at least receive an update package comprising one or more delta files corresponding to an original file. The computer program code instructions are configured to, upon execution, cause the apparatus to at least cause the original file to be decompressed, generate one or more modified subfiles based on the one or more delta files and the decompressed original file, and to generate a compressed modified file by compressing the one or more modified subfiles.

In a still further embodiment, an apparatus is provided that includes means for receiving an original file and a modified file. The apparatus further includes means for causing the original file and the modified file to be decompressed and means for generating one or more delta files based on the decompressed original file and the decompressed modified file.

In another embodiment, an apparatus is provided that includes means for receiving an update package comprising one or more delta files corresponding to an original file. The apparatus further includes means for causing the original file to be decompressed, means for generating one or more modified subfiles based on the one or more delta files and the decompressed original file, and means for generating a compressed modified file by compressing the one or more modified subfiles.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Also as used herein, the terms "modify" and "update" may be used interchangeably to refer to modifying or changing a file in accordance with embodiments of the present invention, and may refer to the file being "updated" to match a more current version, modified to match an older version, or modified in any other way or for any other purpose. Moreover, a "file" as used herein may refer to any collection of related data or program records stored as a unit. Thus, a "file" as used herein may, for example, represent any discrete component of a software program, firmware, or any other set of machine or computer readable instructions or data. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As described below, a method, apparatus and computer program product are provided for modifying, e.g., updating, compressed files. In this regard, the method, apparatus and computer program product of an example embodiment may efficiently prepare binary update packages for compressed files. The method, apparatus, and computer program of another embodiment may install the efficiently-prepared binary update package. Thus, the method, apparatus, and computer program of these embodiments may allow the amount of data that may be exchanged between a device receiving an update package containing updates for compressed files and the provider of the update package to be reduced.

Figure 1:
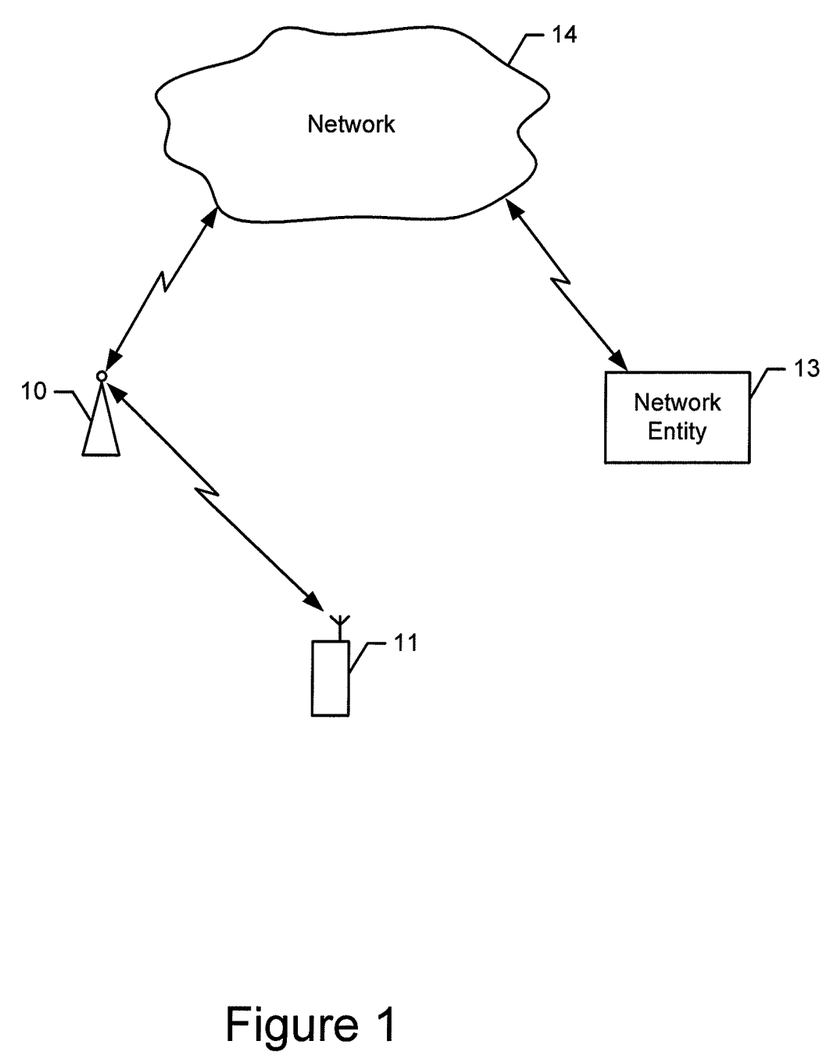
FIG. 1 is a schematic representation of a system that may support example embodiments of the present invention.
Figure 3:
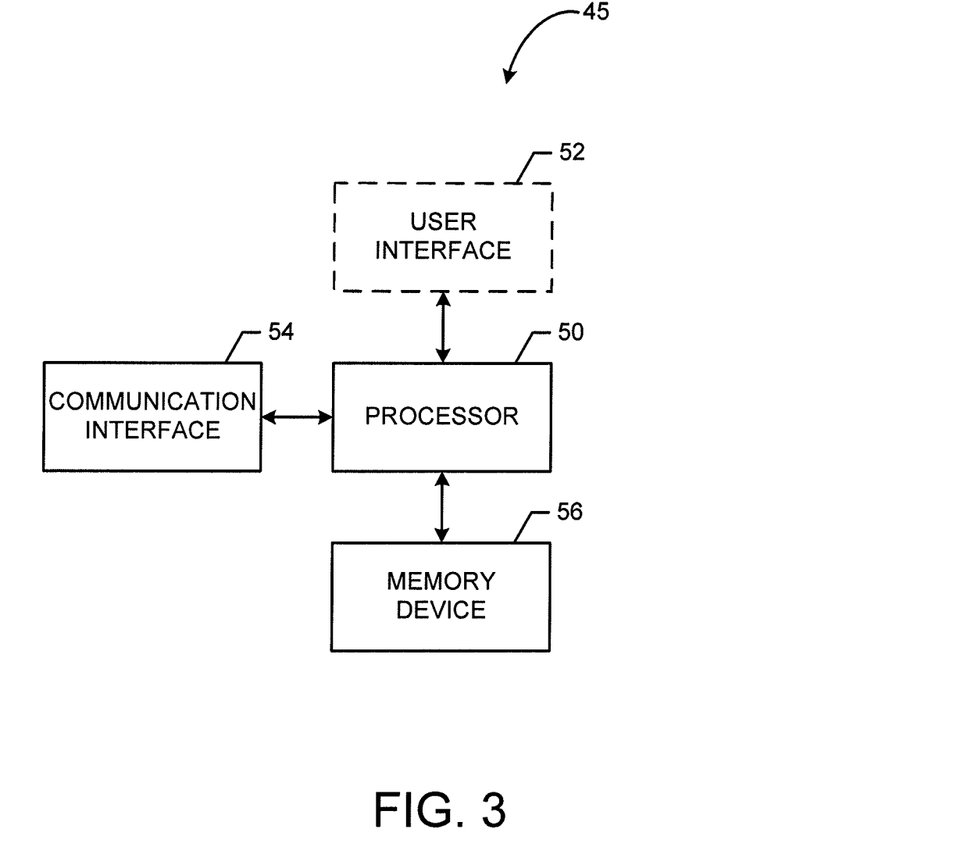
FIG. 3 is a block diagram of an apparatus that may be embodied by or associated with an electronic device, and may be configured to implement example embodiments of the present invention.

FIG. 1 illustrates a block diagram of a system that may benefit from embodiments of the present invention. While FIG. 1 illustrates one example of a system that would benefit from the present invention, numerous other systems and configurations may also benefit from embodiments of the present invention. With reference to FIG. 1, however, the system may include a user device 11, connected to a network 14 via an access point 10, and a network entity 13, such as a server also connected to network 14. User device 11 may be any device that is configured to communicate over any type of network. For example, user device 11 may be a mobile terminal, such as a mobile telephone, PDA, pager, laptop computer, tablet computer, or any of numerous other hand held or portable communication devices, computation devices, content generation devices, content consumption devices, or combinations. User device 11 and network entity 13 may include or be associated with an apparatus 45, such as shown in FIG. 3, configured in accordance with embodiments of the present invention, as described below.

As shown in FIG. 1, user device 11 and network entity 13 may communicate with one another via network 14, which user device 11 may connect to via access point 10. User device 11 and access point 10 may communicate with each other via wireless means such as, for example, WI-FI, BLUETOOTH, or the like, or via wired means such as Ethernet, USB (Universal Serial Bus), or the like. Access point 10 may also allow device 11 to access network 14 via a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. Access point 10 may communicate with network 14 via wired means, such as via fiber optic or coaxial cable, twisted-pair Ethernet cable, digital subscriber line (DSL), or by connecting with a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS)

network or other type of network. Network entity 13 may similarly communicate with network 14 via wired or wireless means. Thus, it should be understood that embodiments of the present invention may be implemented in any type of system in which a device, such as device 11, may communicate with an update provider, such as network entity 13. The means by which the device and update provider communicate, and any intervening entities, devices, networks, communications means, or the like, are not material to the operations of embodiments of the present invention.

Figure 2:
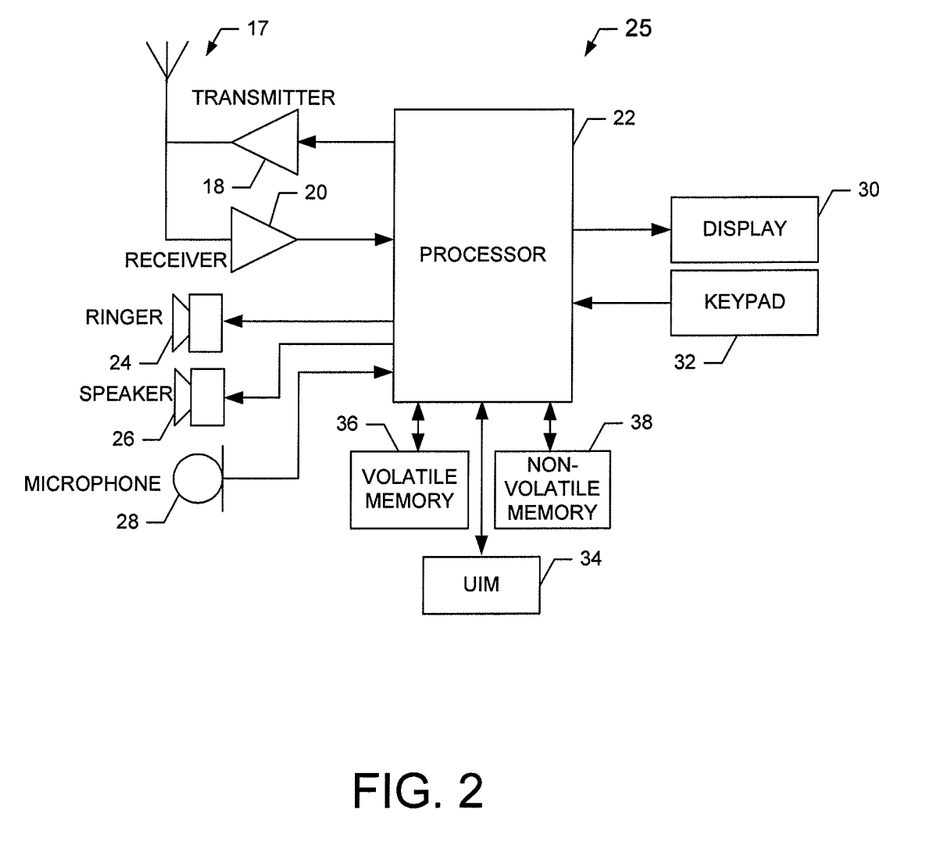
FIG. 2 is a block diagram of an electronic device that may be configured to implement example embodiments of the present invention.

In one embodiment, user device 11 may be embodied by a mobile terminal. In this regard, a block diagram of a mobile terminal 25 that would benefit from embodiments of the present invention is illustrated in FIG. 2. It should be understood, however, that the mobile terminal 25 as illustrated and hereinafter described is merely illustrative of one type of user device that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user devices including fixed (non-mobile) electronic devices may also employ some example embodiments.

The mobile terminal 25 may include an antenna 17 (or multiple antennas) in operable communication with a transmitter 18 and a receiver 20. The mobile terminal 25 may further include an apparatus, such as a processor 22 or other processing device (e.g., processor 50 of the apparatus of FIG. 3), which controls the provision of signals to and the receipt of signals from the transmitter 18 and receiver 20, respectively. The signals may include signaling information in accordance with the air interface standard of the applicable cellular system, and also user speech, received data and/or user generated data. In this regard, the mobile terminal 25 is capable of operating with one or more air interface standards, communication protocols, modulation types, and access types. By way of illustration, the mobile terminal 25 is capable of operating in accordance with wireless communication mechanisms. For example, mobile terminal 25 may be capable of communicating in a wireless local area network (WLAN) or other communication networks, for example in accordance with one or more of the IEEE 802.11 family of standards, such as 802.11a, b, g, or n. As an alternative (or additionally), the mobile terminal 25 may be capable of operating in accordance with any of a number of first, second, third and/or fourth-generation cellular communication protocols or the like. For example, the mobile terminal 25 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like.

In some embodiments, the processor 22 may include circuitry desirable for implementing audio and logic functions of the mobile terminal 25. For example, the processor 22 may be comprised of a digital signal processor device, a microprocessor device, and various analog to digital converters, digital to analog converters, and other support circuits. Control and signal processing functions of the mobile terminal 25 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 25 to transmit and receive Web content, such as location-based content and/or other web page content, according to a Wireless Application Protocol (WAP), Hypertext Transfer Protocol (HTTP) and/or the like, for example.

The mobile terminal 25 may also comprise a user interface including an output device such as a conventional earphone or speaker 26, a ringer 24, a microphone 28, a display 30, and a user input interface, all of which are coupled to the processor 22. The user input interface, which allows the mobile terminal 25 to receive data, may include any of a number of devices allowing the mobile terminal 25 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 25. Alternatively or additionally, the keypad 32 may include a conventional QWERTY keypad arrangement. The keypad 32 may also include various soft keys with associated functions. In addition, or alternatively, the mobile terminal 25 may include an interface device such as a joystick or other user input interface. Some embodiments employing a touch screen display, as described further below, may omit the keypad 32 and any or all of the speaker 26, ringer 24, and microphone 28 entirely. The mobile terminal 25 further includes a battery, such as a vibrating battery pack, for powering various circuits that are required to operate the mobile terminal 25, as well as optionally providing mechanical vibration as a detectable output.

The mobile terminal 25 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 25 may be equipped with memory. For example, the mobile terminal 25 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 25.

Example embodiments of the invention will now be described with reference to FIG. 3, in which certain elements of an apparatus 45 for preparing and installing update packages for compressed files are depicted. In order to prepare an update package, the apparatus 45 of FIG. 3 may be employed, for example, in conjunction with network entity 13. In order to install an update package, the apparatus 45 of FIG. 3 may be employed, for example, in conjunction with user device 11. However, it should be noted that the apparatus 45 of FIG. 3 may also be employed in connection with a variety of other devices, both mobile and fixed, in order to prepare or install update packages. For example, the apparatus 45 may be embodied by or associated with a personal computer or other user terminal.

It should also be noted that while FIG. 3 illustrates one example of a configuration of an apparatus 45 for preparing and/or installing update packages, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 45 for preparing and/or installing update packages for compressed files may include or otherwise be in communication with a processor 50, a communication interface 54, and a memory device 56. As described below and as indicated by the dashed lines in FIG. 3, the apparatus 45 may also optionally include a user interface 52 in some embodiments, such as embodiments in which the apparatus 45 is embodied as user device 11. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or non-volatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 25, the memory device 56 may be embodied by the memory 36, 38. The memory device 56 may be configured to store information, data, content, applications, instructions, or the like, for enabling the apparatus to carry out various functions in accordance with an example embodiment of the present invention. For example, the memory device 56 could be configured to buffer input data for processing by the processor 50. Additionally or alternatively, the memory device 56 could be configured to store instructions for execution by the processor 50.

The apparatus 45 may, in some embodiments, be embodied by or associated with a user terminal (e.g., mobile terminal 25) or a fixed communication device or computing device (e.g., network entity 13) configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 25, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network, such as network 14, and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 15, the communication interface 54 may be embodied by the antenna 16, transmitter 18, receiver 20 or the like.

In some embodiments, such as instances in which the apparatus 45 is embodied by user device 11, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by network entity 13, the apparatus 45 may not include a user interface 52.

Figure 4A:
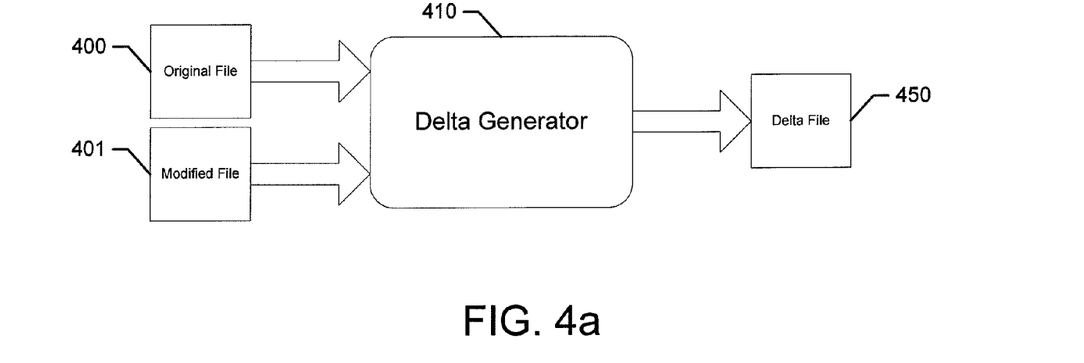
FIGS. 4a and 4b are flowcharts illustrating update package preparation and installation procedures for uncompressed files.
Figure 4B:
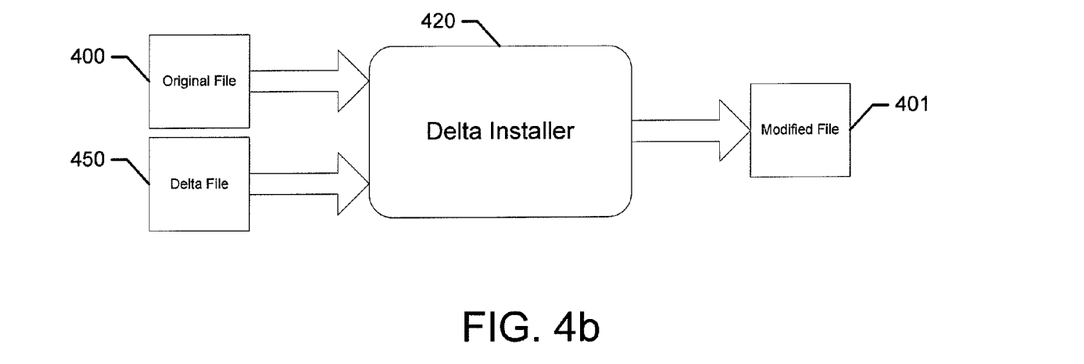

Before proceeding with the description of various embodiments of the present invention, it is beneficial to consider the operations and disadvantages of applying an update package preparation and installation procedure, as depicted in FIGS. 4a and 4b, to compressed files. In an update package preparation procedure, as depicted in FIG. 4a, an original file 400 and a modified, e.g., updated, file 401 are fed to a delta generator 410. The delta generator 410 compares the original 400 and modified 401 files and generates a delta file 450 based on the differences. This delta file 450 is then provided to a device for installation. The installation procedure, as depicted in FIG. 4b, involves feeding the original file 400 and delta file 450 into a delta installer 420. The delta installer applies the changes represented in the delta file 450 to the original file 400, thus generating a modified file 401 identical to the modified file 401 used to create the delta file 450. The advantage of this type of procedure for updating files is that a delta file 450, which contains only differences between original file 400 and modified file 401, will likely be significantly smaller, and thus easier to transmit, than modified file 401.

However, as alluded to in the Background section, when the original file 400 and modified file 401 are compressed files, the efficiency of the above described procedures may be lost. As used herein, a "compressed file" may refer to any file that contains one or more subfiles that have been compressed according to any compression algorithm, such that the size of the compressed file is, preferably, no more than the sum of the sizes of the subfile(s) it contains. The compression algorithm may, for example, be a lossless compression algorithm such as, for example, gzip, lzma, png or the like. The compression algorithm may also be a "lossy" compression algorithm such as, for example, jpeg, mp3, or the like. Accordingly, an "uncompressed file" or "decompressed file" may refer to the one or more subfiles previously contained in the corresponding compressed file. The algorithm used to create a compressed file may make any number of changes to the subfile(s) in order to reduce their size. Thus, consider hypothetical files A and B, which contain program code and differ only in that file B contains one additional function that A does not contain. Because the difference between these files is small, a delta file generated based on files A and B will likely also be small. However, compressed file A will likely be quite different, especially at a binary level, from uncompressed file A, and likely even more different from compressed file B. Thus, a delta file generated based on compressed file A and compressed file B may be quite large, and in some cases, almost as large as compressed file B itself. For this reason, the delta file-based update package preparation/installation procedure depicted in FIGS. 4a and 4b may be ill-suited for use with compressed files.

Figure 5A:
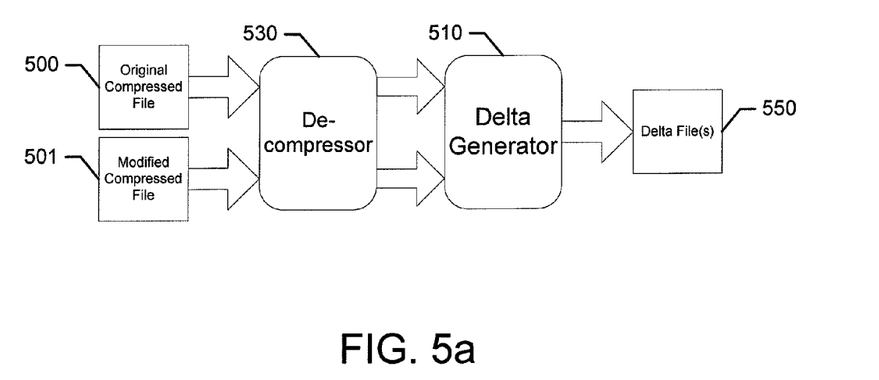
FIGS. 5a and 5b are flowcharts illustrating update package preparation and installation procedures for compressed files according to example embodiments of the present invention.
Figure 5B:
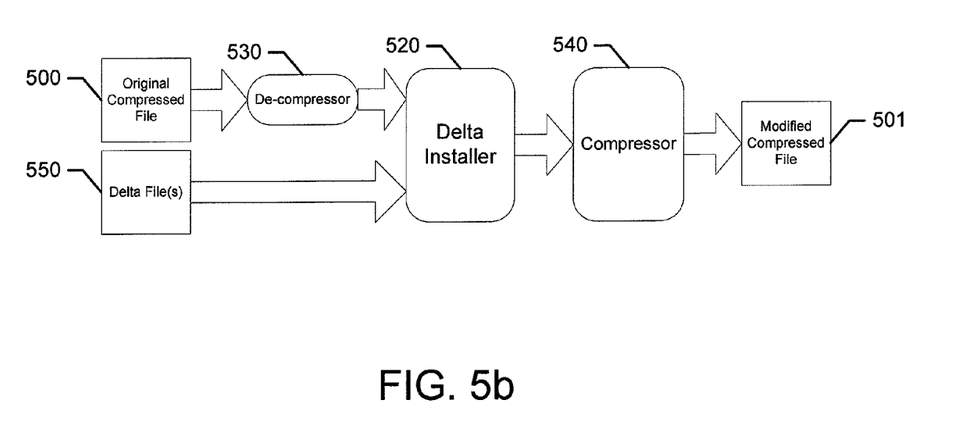

Thus, referring now to FIG. 5a, an overview of the data flows for the process of preparing an update package for updating one or more compressed files according to an embodiment of the present invention is depicted. A representation of the corresponding process of installing an update package that updates one or more compressed files is presented in FIG. 5 b. Referring now to FIG. 5a, a compressed original file 500 and a compressed modified file 501 are first decompressed via a de-compressor 530. Next, the decompressed original file, e.g., the one or more original subfiles, and decompressed modified file, e.g., the one or more modified subfiles, are fed to delta generator 510, which generates one or more delta files 550 based on the uncompressed original 500 and modified 501 files, e.g., by comparing each of the one or more original subfiles to its corresponding modified subfile. Referring now to FIG. 5b, the installation procedure begins with compressed original file 500 being decompressed by de-compressor 530. The uncompressed original file(s) and the delta file(s) 550 are then fed into delta installer 520, which updates the uncompressed original file, e.g., the original subfiles, according to the one or more delta files 550, e.g., by modifying each original subfile according to its corresponding delta file. The resulting decompressed modified file, e.g., one or more modified subfiles, is then fed into compressor 540, resulting in compressed modified file 501. It should be understood that compressor 540, de-compressor 530, delta generator 510, and delta installer 520 may be embodied as hardware or software modules. That is, each may be embodied, for example, as circuitry, or be implemented as program instructions stored in memory and executed by a processor, such as memory 56 and processor 50 of apparatus 45.

Thus, turning now to FIG. 6, the operations of apparatus 45 for preparing an update package will now be described in more detail, including examples of operations that may precede or follow those depicted in FIG. 5a. In this regard and as described below, the operations of FIG. 6 may be performed by an apparatus 45, such as shown in FIG. 3, embodied by or otherwise associated with network entity 13. In this regard, the apparatus 45 may include means, such as processor 50, memory device 56, and communication interface 54 or the like, for receiving an original file and a modified file. See operation 600. The original and modified files may be already stored in memory, such as memory 56, or may, for example, be provided to the apparatus 45 by a network operator, software vendor, hardware manufacturer, or any other party, such as via network 14. Apparatus 45 may further include means, such as those mentioned above, for determining whether the original and modified files are compressed files. See operation 610. According to an example embodiment, apparatus 45 may, for example, determine whether the files are compressed files as part of determining the file types of the modified and original files, such as whether the file is a compressed file, a folder, a symbolic link, a normal file, or any other type of file. As the modified and original files may be the same type, apparatus 45 may, according to an example embodiment, only determine a type for one of the files, such as by only determining the type of the original file or the modified file. Whether apparatus 45 determines the types of both the modified and original files, or only one file of the pair, or merely whether each pair or individual file is compressed, apparatus 45 may further cause these results to be stored, such as in a configuration file.

Having determined whether the files are compressed, apparatus 45 may further include means, such as processor 50 and memory device 56 or the like, for generating one or more delta files. Thus, apparatus 45 may include means, such as those just mentioned, for generating a delta file based on the original and modified files in the manner depicted in FIG. 4*a* and discussed above in an instance in which the original and modified files are not compressed files. See operation 611. Apparatus 45 may also include means, such as those mentioned above, for generating a delta file based on the original and modified files in the manner depicted in FIG. 5*a* in an instance in which the original and modified files are compressed files. Thus, apparatus 45 may include means for decompressing both the compressed original file and the compressed modified file. See operation 620. Apparatus 45 may further include means for generating one or more delta files based on the decompressed original file and decompressed modified file. See operation 630.

Having generated the one or more delta files, apparatus 45 may further include means, such as processor 50, memory device 56, and communication interface 54 or the like, for causing the one or more delta files to be transmitted. See operation 640. The delta files may, for example, be transmitted to a device, such as device 11, which, for example, contains software or firmware to update. According to another embodiment, the delta files may, for example, be transmitted to another network entity, such as a server. The other network entity, according to another embodiment, may, for example, store the delta files and/or transmit them to a device, such as device 11. According to an example embodiment, apparatus 45 may also cause a configuration file to be transmitted along with the one or more delta files. As discussed above, the configuration file may, according to one embodiment, contain the file types of each of the files that correspond to the one or more delta files. According to another embodiment, the configuration file may only contain an indication of whether each file that corresponds to the one or more delta files is a compressed file. Thus, for example, in an instant in which a compressed file contains multiple subfiles, the configuration file may list each of the subfiles together with an indication that they belong to a compressed file, such as an indication of which compressed file they belong to.

Figure 6:
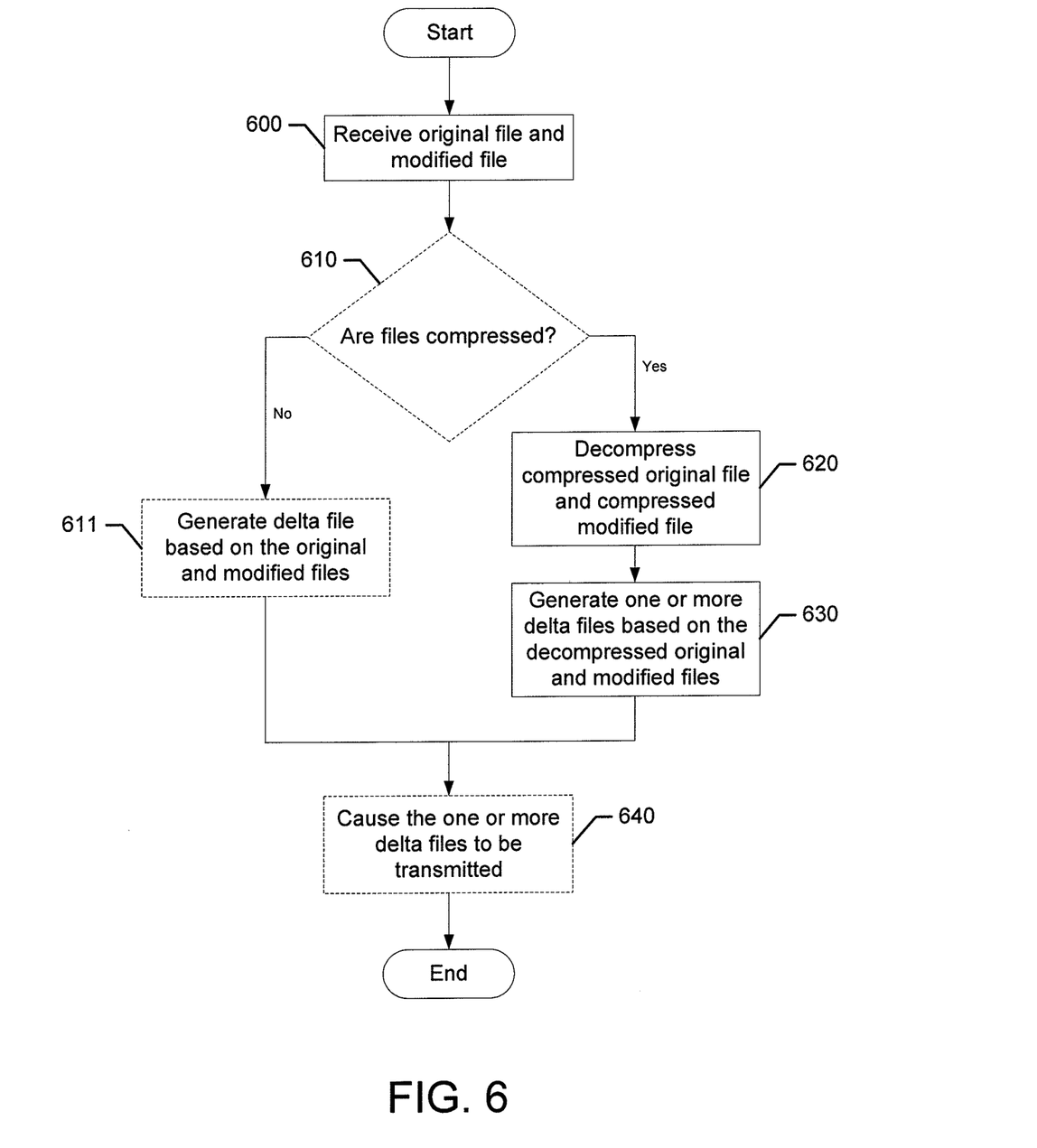
FIGS. 6 and 7 are flowcharts illustrating operations according to embodiments of the present invention.

According to an example embodiment, when an update package for updating multiple files is being prepared, the operations of FIG. 6 described above may, for example, be iteratively performed by apparatus 45 in order to generate multiple delta files, such as one or more delta files for each of one or more pairs of original and modified files. According to another example embodiment, apparatus 45 may first iteratively perform steps 600 and 610, then iteratively perform steps 611 and/or 620 and 630. That is, apparatus 45 may first determine whether each file is a compressed file, such as by determining a type for each file, record the results in a configuration file, and then generate delta files according to operation 611 or operations 620 and 630 for each of the files based on whether they are compressed or not. Apparatus 45 may perform operation 640, i.e., causing the delta files to be transmitted, either after they have all been generated, e.g., all at once, or as they are generated.

Thus, according to an example embodiment, apparatus 45 associated with network entity 13 may carry out operations 600, 610, 620, and 630 to generate an update package for updating a filesystem comprising one or more original files as follows. Apparatus 45 may first detect whether each file to be updated in the filesystem is a compressed file, such as, for example, by detecting the type of every file in the filesystem to be updated. The original and modified filesystems may, for example, be stored as flashfiles (images). Apparatus 45 may then cause each compressed modified and original file in the filesystem to be decompressed, and, according to one example embodiment, may cause any subfiles the compressed modified and original files contain to be stored in respective temporary folders. Next, apparatus 45 may cause one or more delta files to be generated for each pair of decompressed original and modified files and stored in an update package. For example, apparatus 45 may compare every file in the original filesystem to every corresponding file in the modified filesystem, such as by, for example, causing the decompressed original and modified filesystems to be mounted by a delta calculation tool which performs the comparison. Thus, according to an example embodiment, complete files that are included in the modified filesystem, but not the original file system, may be included in the update package. Files that are included in the original filesystem, but not the modified filesystem may be omitted from the update package. Files which are in both the original and modified filesystem, and are not identical, would thus have a corresponding delta file generated for them. Apparatus 45 may also cause a configuration file to be created and added to the update package. The configuration file may, for example, include indications of which files in the original filesystem are to be removed, which files are to be added, and which files are to be modified. For compressed files that are to be modified, an indication may be included in the configuration file that lists any subfiles together along with an indication that they belong to a particular compressed file.

Figure 7:
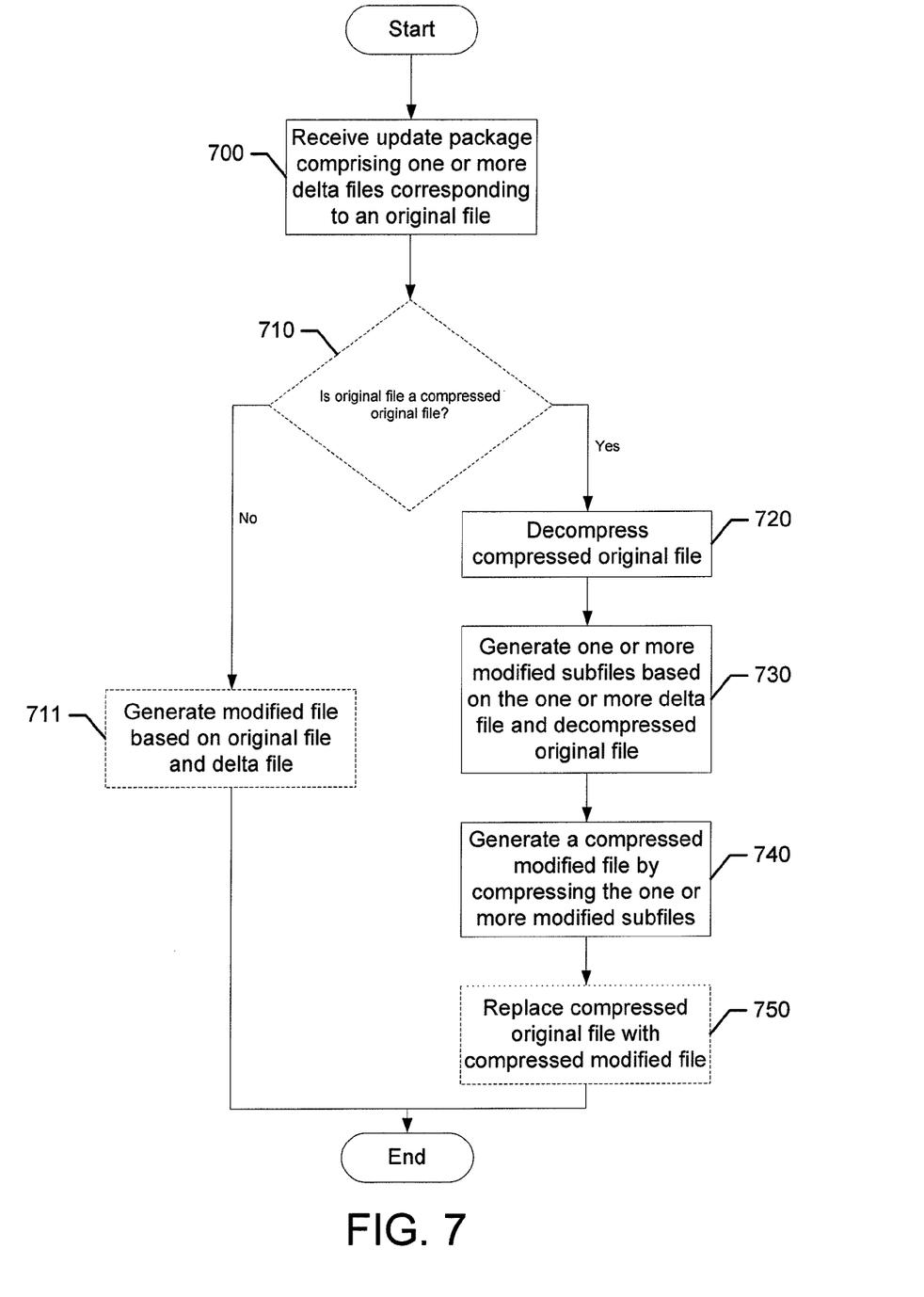

Turning now to FIG. 7, the operations of apparatus 45 for installing an update package will now be described in more detail, including examples of operations that may precede or follow those depicted in FIG. 5*b*. In this regard and as described below, the operations of FIG. 7 may be performed by an apparatus 45, such as shown in FIG. 3, embodied by or otherwise associated with user device 11. In this regard, the apparatus 45 may include means, such as processor 50, memory device 56, and communication interface 54 or the like, for receiving an update package comprising one or more delta files corresponding to an original file. See operation 700. According to an example embodiment, the update package may also contain at least one configuration file, such as a configuration file as discussed above. The update package may, for example, be provided to the apparatus 45 by network entity 13 via network 14. Apparatus 45 may further include means, such as those mentioned above, for determining whether the original file is a compressed original file. See operation 710. According to an example embodiment, apparatus 45 may, for example, determine whether the original file is a compressed original file based on a configuration file contained in the update package.

Having determined whether the original file is a compressed original file, apparatus 45 may further include means, such as processor 50 and memory device 56 or the like, for installing the update package. Thus, apparatus 45 may include means, such as those just mentioned, for installing the update package in the manner depicted in FIG. 4*b* and discussed above in an instance in which the original file is not a compressed original file. See operation 711. Apparatus 45 may also include means, such as those previously mentioned, for installing the update package in the manner depicted in FIG. 5*b* in an instance in which the one or more of the delta files contained in the update package correspond to a compressed original file. Thus, apparatus 45 may include means, such as processor 50 and memory device 56 or the like, for decompressing the compressed original file. See operation 720. Apparatus 45 may further include means, such as those just mentioned, for generating one or more modified subfiles based on the one or more delta files and the decompressed original file. See operation 730. Apparatus 45 may also include means, such as those mentioned above, for compressing the one or more modified subfiles, thus creating a compressed modified file. See operation 740. Having created a compressed modified file, apparatus 45 may further include means, such as those discussed above, for replacing the compressed original file with the compressed modified file. See operation 750.

According to an example embodiment, when an update package for updating a filesystem comprising multiple original files is being installed, operations 710, 711, 720, 730, 740, and 750 of FIG. 7 described above may, for example, be iteratively performed by apparatus 45 in order to update the multiple original files. That is, apparatus 45 may receive an update package comprising one or more delta files corresponding to multiple original files and then determine whether each original file is a compressed file, such as by determining a type for each file. Having determined whether each original file is a compressed file, apparatus 45 may then perform either operation 711, or operations 720, 730, 740, and 750, on each original file depending on whether the particular original file is compressed. According to another embodiment, apparatus 45 may instead determine whether a particular original file is compressed or not and then carry out either operation 711, or operations 720, 730, 740, and 750, based on whether the particular file is compressed, repeating this process for each original file.

Thus, according to an example embodiment, apparatus 45 associated with user device 11 may carry out operations 710, 720, 730, 740, and 750 as follows. Apparatus 45 may, after receiving the update package, read the configuration file contained therein. If an update for a compressed file is found, apparatus 45 may decompress the compressed original file. According to one embodiment, the apparatus 45 may further cause any resulting original subfile(s) to be stored, for example, in a temporary folder. Next, apparatus 45 may apply the delta file(s) listed in the configuration file to the uncompressed original file, e.g., original subfiles, thus generating one more modified subfiles. Once the uncompressed original subfile(s) have been updated successfully, apparatus 45 may cause the compressed original file to be deleted or otherwise removed from the filesystem, and cause any modified subfile(s) in the temporary folder to be compressed, thus generating a compressed modified file. Apparatus 45 may then name the compressed modified file the same as the compressed original file (now removed). Apparatus 45 may, according to an example embodiment, use one or more delta installers for performing the above operations. For example, one delta installer may be used updating normal files and one for updating compressed files.

As described above, FIGS. 4 through 7 illustrate flowcharts of an apparatus 45, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. Moreover, one or more of the entities described above, such as delta installers, delta calculation tools and the like, may also be embodied by computer program instructions. In this regard, the computer program instructions which embody the procedures described above may be stored by a memory device 56 of an apparatus 45 employing an embodiment of the present invention and executed by a processor 50 of the apparatus 45. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

The method, apparatus 45 and computer program product described above provide many advantages. For example the method, apparatus 45 and computer program products may reduce the size of binary delta files used to update compressed files. Accordingly, the method, apparatus 45 and computer program product described above may reduce the data that must be transmitted to a user device 11 in order to update software, firmware, or the like, reducing download costs for consumers, and network traffic for network operators.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving an original file and a modified file;
causing, by a processor, determination of whether the original file and the modified file are compressed files;
causing, by the processor, generation of a configuration file that is different from the original file and the modified file, the configuration file indicating whether the original file and the modified file are compressed files and further indicating file types of the original file and the modified file;
causing the original file and the modified file to be decompressed into a decompressed original file and a decompressed modified file based on a determination that the original file and the modified file are compressed files; and
causing, by the processor, generation of one or more delta files based on the decompressed original file and the decompressed modified file, wherein each of the one or more delta files comprises differences between the decompressed original file and the decompressed modified file.

2. The method of claim 1, further comprising:
causing the one or more delta files to be transmitted.

3. The method of claim 2, wherein the configuration file is transmitted with the one or more delta files.

4. The method of claim 1, wherein the configuration file further indicates at least one of:
one or more files in an original filesystem that are to be removed;
one or more files that are to be added to the original filesystem;
one or more files in the original filesystem that are to be modified; and
one or more subfiles that belong to a particular compressed file.

5. An apparatus comprising at least one processor and at least one memory storing program code instructions, the memory and program code instructions being configured to, with the processor, cause the apparatus to at least:
receive an original file and a modified file;
determine whether the original file and the modified file are compressed files;
generate a configuration file that is different from the original file and the modified file, the configuration file indicating whether the original file and the modified file are compressed files and further indicating file types of the original file and the modified file;
decompress the original file and the modified file into a decompressed original file and a decompressed modified file based on a determination that the original file and the modified file are compressed files; and
generate one or more delta files based on the decompressed original file and the decompressed modified file, wherein each of the one or more delta files comprises differences between the decompressed original file and the decompressed modified file.

6. The apparatus of claim 5, wherein the memory and program code instructions are further configured to, with the processor, cause the apparatus to:
cause the one or more delta files to be transmitted.

7. The apparatus of claim 6, wherein the memory and the program code instructions are further configured to, with the processor, cause the apparatus to transmit the configuration file with the one or more delta files.

8. The apparatus of claim 5, wherein the configuration file further indicates at least one of:
one or more files in an original filesystem that are to be removed;
one or more files that are to be added to the original filesystem;
one or more files in the original filesystem that are to be modified; and
one or more subfiles that belong to a particular compressed file.

9. A computer program product comprising a non-transitory computer readable medium storing program code portions therein, the program code portions being configured to, upon execution, cause an apparatus to at least:
receive an original file and a modified file;
determine whether the original file and the modified file are compressed files;
generate a configuration file that is different from the original file and the modified file, the configuration file indicating whether the original file and the modified file are compressed files and further indicating file types of the original file and the modified file;
decompress the original file and the modified file into a decompressed original file and a decompressed modified file based on a determination that the original file and the modified file are compressed files; and
generate one or more delta files based on the decompressed original file and the decompressed modified file, wherein each of the one or more delta files comprises differences between the decompressed original file and the decompressed modified file.

10. The apparatus of claim 9, wherein the program code portions are further configured to, upon execution, cause the apparatus to:
transmit the one or more delta files.

11. The apparatus of claim 10, wherein the program code portions are further configured to, upon execution, cause the apparatus to transmit the configuration file with the one or more delta files.

12. The apparatus of claim 9, wherein the configuration file further indicates at least one of:
one or more files in an original filesystem that are to be removed;
one or more files that are to be added to the original filesystem;
one or more files in the original filesystem that are to be modified; and
one or more subfiles that belong to a particular compressed file.

13. An apparatus comprising:
means for receiving an original file and a modified file;
means for causing determination of whether the original file and the modified file are compressed files;
means for causing generation of a configuration file that is different from the original file and the modified file, the configuration file indicating whether the original file and the modified file are compressed files and further indicating file types of the original file and the modified file;
means for causing the original file and the modified file to be decompressed into a decompressed original file and a decompressed modified file based on a determination that the original file and the modified file are compressed files; and
means for causing generation of one or more delta files based on the decompressed original file and the decompressed modified file, wherein each of the one or more delta files comprises differences between the decompressed original file and the decompressed modified file.

14. The apparatus of claim 13, further comprising:
means for causing the one or more delta files to be transmitted.

15. The apparatus of claim 14, wherein the means for causing the one or more delta files to be transmitted comprises means for causing the one or more delta files to be transmitted with the one or more delta files.

16. The apparatus of claim 13, wherein the configuration file further indicates at least one of:
one or more files in an original filesystem that are to be removed;
one or more files that are to be added to the original filesystem;
one or more files in the original filesystem that are to be modified; and
one or more subfiles that belong to a particular compressed file.

* * * * *